US011947697B2

(12) United States Patent
Dawkins et al.

(10) Patent No.: US 11,947,697 B2
(45) Date of Patent: Apr. 2, 2024

(54) METHOD AND SYSTEM TO PLACE RESOURCES IN A KNOWN STATE TO BE USED IN A COMPOSED INFORMATION HANDLING SYSTEM

(71) Applicant: Dell Products L.P., Round Rock, TX (US)

(72) Inventors: William Price Dawkins, Lakeway, TX (US); Valerie Diane Padilla, Austin, TX (US); Jon Robert Hass, Austin, TX (US); Sudhir Vittal Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 350 days.

(21) Appl. No.: 17/382,886

(22) Filed: Jul. 22, 2021

(65) Prior Publication Data

US 2023/0026690 A1   Jan. 26, 2023

(51) Int. Cl.
*G06F 21/62* (2013.01)
*G06F 9/50* (2006.01)
*G06F 21/60* (2013.01)

(52) U.S. Cl.
CPC ........ *G06F 21/6218* (2013.01); *G06F 9/5022* (2013.01); *G06F 9/5055* (2013.01); *G06F 21/602* (2013.01); *G06F 2221/2143* (2013.01)

(58) Field of Classification Search
CPC .. G06F 21/6218; G06F 9/5022; G06F 9/5055; G06F 21/602; G06F 2221/2143; G06F 9/5027; G06F 9/5077; G06F 11/3006; G06F 11/3051; G06F 11/3409
See application file for complete search history.

(56) References Cited

U.S. PATENT DOCUMENTS

| 7,478,117 B1 | 1/2009 | Lamb et al. |
| 7,606,892 B2 | 10/2009 | Piet et al. |
| 7,620,984 B2 | 11/2009 | Kallahalla |

(Continued)

FOREIGN PATENT DOCUMENTS

| WO | WO-2005071552 A1 * | 8/2005 | ......... G06F 21/6245 |
| WO | WO-2007120772 A2 * | 10/2007 | ........ G06F 17/30011 |

OTHER PUBLICATIONS

Alachiotis, Nikolaos, et al. "dReDBox: A disaggregated architectural perspective for data centers." Hardware Accelerators in Data Centers. Springer, Cham, 2019. pp. 35-56. (Year: 2019) (22 pages).

(Continued)

*Primary Examiner* — Meng Li
(74) *Attorney, Agent, or Firm* — Chamberlain, Hrdlicka, White, Williams & Aughtry; Aly Z. Dossa

(57) ABSTRACT

In general, the invention relates to providing computer implemented services using information handling systems. One or more embodiments of the invention includes receiving a request to decompose a composed information handling system, wherein the composed information handling system comprises a hardware resource, obtaining a cleaning requirement for the hardware resource, initiating, based on the cleaning requirement, a cleaning operation on the hardware resource, receive a confirmation that the cleaning operation is complete, and after receiving the confirmation, set a state of the hardware resource to allocatable.

17 Claims, 11 Drawing Sheets

(56) References Cited

U.S. PATENT DOCUMENTS

| | | |
|---|---|---|
| 8,095,929 B1 | 1/2012 | Ji et al. |
| 8,266,636 B2 | 9/2012 | Kharat et al. |
| 8,276,140 B1 | 9/2012 | Beda, III et al. |
| 8,285,747 B1 | 10/2012 | English |
| 8,306,948 B2 | 11/2012 | Chou |
| 8,499,066 B1 | 7/2013 | Zhang et al. |
| 8,589,659 B1 | 11/2013 | Shapiro |
| 8,606,920 B1 | 12/2013 | Gupta et al. |
| 8,751,546 B1 | 6/2014 | Grieve |
| 8,997,242 B2 | 3/2015 | Chen |
| 9,104,844 B2 | 8/2015 | Fang |
| 9,105,178 B2 | 8/2015 | Carlson |
| 9,245,096 B2 | 1/2016 | Abuelsaad |
| 9,413,819 B1 | 8/2016 | Berg et al. |
| 9,529,689 B2 | 12/2016 | Ferris et al. |
| 9,569,598 B2 | 2/2017 | Abuelsaad |
| 9,600,553 B1 | 3/2017 | Nigade et al. |
| 9,613,147 B2 | 4/2017 | Carlson |
| 9,678,977 B1 | 6/2017 | Aronovich |
| 9,959,140 B2 | 5/2018 | Jackson |
| 10,097,438 B2 | 10/2018 | Ferris et al. |
| 10,348,574 B2 | 7/2019 | Kulkarni |
| 10,382,279 B2 | 8/2019 | Roese |
| 10,601,903 B2 | 3/2020 | Bivens |
| 10,628,225 B2 | 4/2020 | Yamato |
| 10,754,741 B1* | 8/2020 | Sethuramalingam ........................ G06F 9/4856 |
| 10,756,990 B1 | 8/2020 | Chakkassery Vidyadharan et al. |
| 10,782,882 B1 | 9/2020 | Wu |
| 10,795,856 B1 | 10/2020 | Smith et al. |
| 10,848,408 B2 | 11/2020 | Uriel |
| 10,860,380 B1 | 12/2020 | Kowalski et al. |
| 10,909,072 B2* | 2/2021 | Sun ........................ G06F 12/084 |
| 10,909,283 B1 | 2/2021 | Wang et al. |
| 10,994,198 B1 | 5/2021 | Byskal et al. |
| 11,119,739 B1 | 9/2021 | Allen et al. |
| 11,134,013 B1 | 9/2021 | Allen et al. |
| 11,221,886 B2 | 1/2022 | Bivens et al. |
| 11,308,234 B1 | 4/2022 | Stapleton |
| 11,537,421 B1 | 12/2022 | Brooker et al. |
| 11,616,686 B1* | 3/2023 | Chandrachood ........................ G06F 9/5005 709/220 |
| 2003/0028642 A1 | 2/2003 | Agarwal et al. |
| 2003/0061262 A1 | 3/2003 | Hahn et al. |
| 2003/0233427 A1 | 12/2003 | Taguchi |
| 2004/0257998 A1 | 12/2004 | Chu et al. |
| 2006/0082222 A1 | 4/2006 | Pincu et al. |
| 2006/0089951 A1* | 4/2006 | Factor ........................ G06F 11/3485 |
| 2006/0230407 A1 | 10/2006 | Rosu et al. |
| 2006/0236100 A1 | 10/2006 | Baskaran et al. |
| 2008/0052480 A1 | 2/2008 | Satoyama et al. |
| 2008/0313476 A1 | 12/2008 | Hansen |
| 2009/0199193 A1 | 8/2009 | Jackson |
| 2009/0282404 A1 | 11/2009 | Khandekar et al. |
| 2010/0138656 A1* | 6/2010 | Chinen ........................ G06F 21/577 713/168 |
| 2010/0217865 A1 | 8/2010 | Ferris |
| 2011/0055378 A1 | 3/2011 | Ferris et al. |
| 2011/0099147 A1 | 4/2011 | Mcalister et al. |
| 2011/0154500 A1 | 6/2011 | Sahita et al. |
| 2011/0258248 A1 | 10/2011 | Jackson |
| 2011/0307570 A1 | 12/2011 | Speks |
| 2012/0047328 A1 | 2/2012 | Williams et al. |
| 2012/0131161 A1 | 5/2012 | Ferris et al. |
| 2012/0221314 A1 | 8/2012 | Bourlatchkov et al. |
| 2012/0222084 A1 | 8/2012 | Beaty et al. |
| 2013/0007710 A1 | 1/2013 | Vedula et al. |
| 2013/0311434 A1 | 11/2013 | Jones |
| 2013/0332901 A1 | 12/2013 | Berg et al. |
| 2013/0346718 A1 | 12/2013 | Meshchaninov et al. |
| 2014/0007097 A1 | 1/2014 | Chin et al. |
| 2014/0149635 A1 | 5/2014 | Bacher et al. |
| 2014/0165063 A1 | 6/2014 | Shiva et al. |
| 2014/0223233 A1 | 8/2014 | Heyrman et al. |
| 2014/0279884 A1 | 9/2014 | Dantkale et al. |
| 2014/0282820 A1 | 9/2014 | Walton et al. |
| 2014/0358972 A1 | 12/2014 | Guarrieri et al. |
| 2014/0359356 A1 | 12/2014 | Aoki |
| 2015/0106165 A1 | 4/2015 | Rai et al. |
| 2015/0178128 A1 | 6/2015 | Knowles et al. |
| 2015/0220455 A1 | 8/2015 | Chen et al. |
| 2015/0281336 A1 | 10/2015 | Beale |
| 2015/0317173 A1 | 11/2015 | Anglin |
| 2015/0381426 A1 | 12/2015 | Roese et al. |
| 2016/0062441 A1 | 3/2016 | Chou et al. |
| 2016/0103698 A1* | 4/2016 | Yang ........................ G06F 9/45558 718/1 |
| 2016/0180087 A1 | 6/2016 | Edwards et al. |
| 2016/0224903 A1 | 8/2016 | Talathi et al. |
| 2016/0259665 A1 | 9/2016 | Gaurav et al. |
| 2017/0031622 A1* | 2/2017 | Nagarajan ........................ G06F 3/0607 |
| 2017/0034012 A1 | 2/2017 | Douglas et al. |
| 2017/0041184 A1 | 2/2017 | Broz et al. |
| 2017/0048200 A1 | 2/2017 | Chastain |
| 2017/0097851 A1 | 4/2017 | Chen |
| 2017/0118247 A1 | 4/2017 | Hussain |
| 2017/0195201 A1 | 7/2017 | Mueller et al. |
| 2017/0201574 A1 | 7/2017 | Luo |
| 2017/0295107 A1 | 10/2017 | Salapura et al. |
| 2018/0024964 A1 | 1/2018 | Mao |
| 2018/0026905 A1 | 1/2018 | Balle et al. |
| 2018/0063145 A1 | 3/2018 | Cayton et al. |
| 2018/0074816 A1* | 3/2018 | Moss ........................ H04L 41/0813 |
| 2018/0157429 A1 | 6/2018 | Venkat et al. |
| 2018/0351836 A1 | 12/2018 | Guim Bernat et al. |
| 2019/0014193 A1 | 1/2019 | Guim Bernat et al. |
| 2019/0065061 A1 | 2/2019 | Kim et al. |
| 2019/0065256 A1 | 2/2019 | Hamilton et al. |
| 2019/0079837 A1 | 3/2019 | Agarwal et al. |
| 2019/0164087 A1 | 5/2019 | Ghibril et al. |
| 2019/0188014 A1 | 6/2019 | Easterling et al. |
| 2019/0190778 A1 | 6/2019 | Easterling et al. |
| 2019/0205180 A1 | 7/2019 | Macha et al. |
| 2019/0227616 A1 | 7/2019 | Jenne et al. |
| 2019/0281373 A1 | 9/2019 | Sadasivarao et al. |
| 2019/0324808 A1 | 10/2019 | Krishnan et al. |
| 2019/0334774 A1 | 10/2019 | Bennett et al. |
| 2019/0356729 A1 | 11/2019 | Bivens et al. |
| 2019/0356731 A1 | 11/2019 | Bivens et al. |
| 2019/0384516 A1* | 12/2019 | Bernat ........................ G06F 3/0673 |
| 2019/0384648 A1 | 12/2019 | Wiggers et al. |
| 2019/0386902 A1 | 12/2019 | Mueller et al. |
| 2020/0026564 A1 | 1/2020 | Bahramshahry et al. |
| 2020/0028854 A1 | 1/2020 | Fabrizi et al. |
| 2020/0034221 A1 | 1/2020 | Ganesan et al. |
| 2020/0034528 A1 | 1/2020 | Yang et al. |
| 2020/0044966 A1 | 2/2020 | Krishnan et al. |
| 2020/0045116 A1 | 2/2020 | Deodhar et al. |
| 2020/0065254 A1 | 2/2020 | Cao et al. |
| 2020/0097358 A1 | 3/2020 | Mahindru et al. |
| 2020/0110639 A1* | 4/2020 | Corsi ........................ G06F 9/3004 |
| 2020/0174949 A1 | 6/2020 | Ramasamy et al. |
| 2020/0218561 A1 | 7/2020 | Lal et al. |
| 2020/0233582 A1 | 7/2020 | Chen et al. |
| 2020/0241798 A1* | 7/2020 | Kanno ........................ G06F 3/064 |
| 2020/0264998 A1 | 8/2020 | Long et al. |
| 2020/0285502 A1 | 9/2020 | Hildebrand et al. |
| 2020/0293375 A1 | 9/2020 | Klein |
| 2020/0341786 A1 | 10/2020 | Soryal |
| 2020/0341798 A1 | 10/2020 | Duleba |
| 2020/0351221 A1 | 11/2020 | Subramani et al. |
| 2020/0351347 A1 | 11/2020 | Chang et al. |
| 2020/0356200 A1 | 11/2020 | Blanco et al. |
| 2020/0358714 A1 | 11/2020 | Singleton, IV et al. |
| 2021/0019062 A1 | 1/2021 | Fessel |
| 2021/0019162 A1 | 1/2021 | Viswanathan et al. |
| 2021/0037466 A1 | 2/2021 | Silva et al. |
| 2021/0111942 A1 | 4/2021 | Tahhan et al. |
| 2021/0117389 A1 | 4/2021 | Cui et al. |
| 2021/0117441 A1 | 4/2021 | Patel et al. |
| 2021/0152659 A1 | 5/2021 | Cai et al. |
| 2021/0185565 A1 | 6/2021 | Kalderen et al. |
| 2021/0224093 A1 | 7/2021 | Fu et al. |
| 2021/0233532 A1 | 7/2021 | Kudurshian et al. |

(56) References Cited

U.S. PATENT DOCUMENTS

| | | | |
|---|---|---|---|
| 2021/0250220 A1 | 8/2021 | Yang et al. | |
| 2021/0286667 A1* | 9/2021 | Yigzaw | G06F 11/0751 |
| 2021/0367901 A1 | 11/2021 | Singh et al. | |
| 2021/0383020 A1* | 12/2021 | Sofia | G06F 21/6272 |
| 2021/0397494 A1 | 12/2021 | Graham | |
| 2022/0179701 A1 | 6/2022 | Saad et al. | |
| 2022/0182288 A1 | 6/2022 | Vaikar et al. | |
| 2022/0191253 A1 | 6/2022 | Rungta et al. | |
| 2022/0197773 A1* | 6/2022 | Butler | H04L 47/83 |
| 2022/0342649 A1 | 10/2022 | Cao et al. | |
| 2023/0026690 A1* | 1/2023 | Dawkins | G06F 9/5077 |
| 2023/0033296 A1 | 2/2023 | Shetty et al. | |
| 2023/0093900 A1* | 3/2023 | Scope | H04L 9/0894 726/27 |
| 2023/0237204 A1* | 7/2023 | Khatri | G06F 3/0622 726/26 |

OTHER PUBLICATIONS

Chunlin, Li, Tang Jianhang, and Luo Youlong, Hybrid cloud adaptive scheduling strategy for heterogeneous workloads, Hybrid cloud adaptive scheduling strategy for heterogeneous workloads, Year: 2019, pp. 419-446, Journal of Grid Computing 17 (28 pages).

Alachiotis, Nikolaos, et al. "dReDBox: A disaggregated architectural perspective for data centers." Hardware Accelerators in Data Centers. Springer, Cham, 2019. pp. 35-56. (Year: 2019).

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

International Searching Authority, International Search Report and Written Opinion dated Oct. 21, 2021 for corresponding PCT Application No. PCT Application No. PCTUS2021029708 filed Apr. 28, 2021.

International Searching Authority, International Search Report and Written Opinion for corresponding PCT Application No. PCT Application No. PCTUS2021029702 filed Apr. 28, 2021, Aug. 19, 2021, 13 pages.

International Searching Authority, International Search Report Written Opinion dated Jul. 19, 2021, issued in corresponding PCT Application No. PCT/US2021/029687, 11 pages.

International Searching Authority, International Search Report Written Opinion of corresponding PCT Application No. PCT/US2021/029698, dated Aug. 9, 2021, 15 pages.

Mohammadi et al., Towards an end-to-end architecture, Towards an end-to-end architecture, 2018, pp. 514-518, 44th Euromicro Conference (5 pages).

Francesco Paolucci, Andrea Sgambelluri, Telemetry in Disaggregated Optical Networks, International Conference on Optical Network Design and Modeling, Year: 2020 (3 pages).

Marcio Barbosa De Carvalho et al., A Cloud Monitoring Framework for Self-Configured Monitoring Slices Based on Multiple Tools, Year: 2013, pp. 180-184 (5 pages).

Peter X. Gao et al., Network Requirements for Resource Disaggregation, USENIX The Advanced Computing Systems Association, Year: 2016, pp. 249-264 (17 pages).

Rui Lin et al., Disaggregated Data Centers: Challenges and Trade-offs, Year: 2020, (7 pages).

* cited by examiner

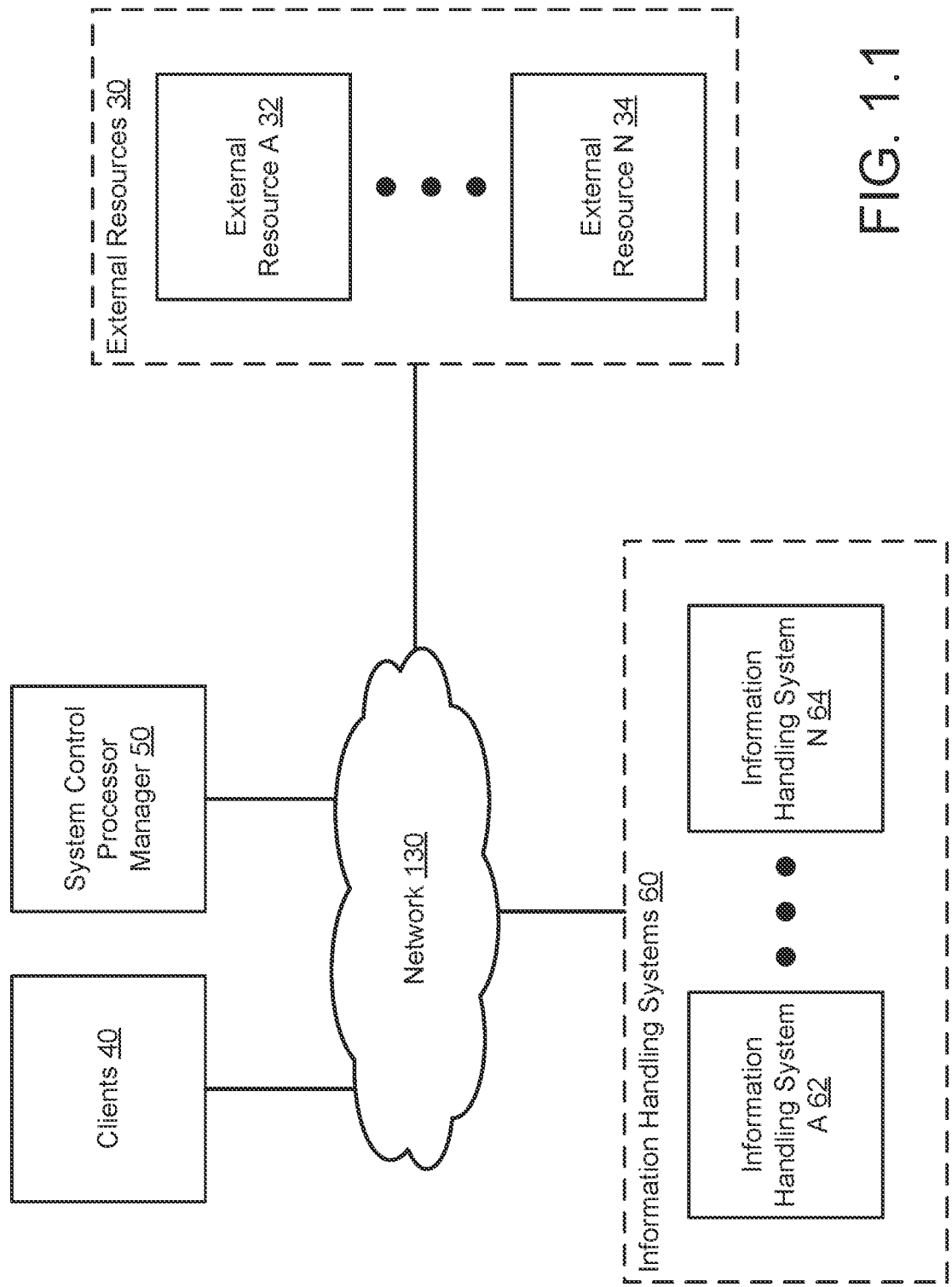
FIG. 1.1

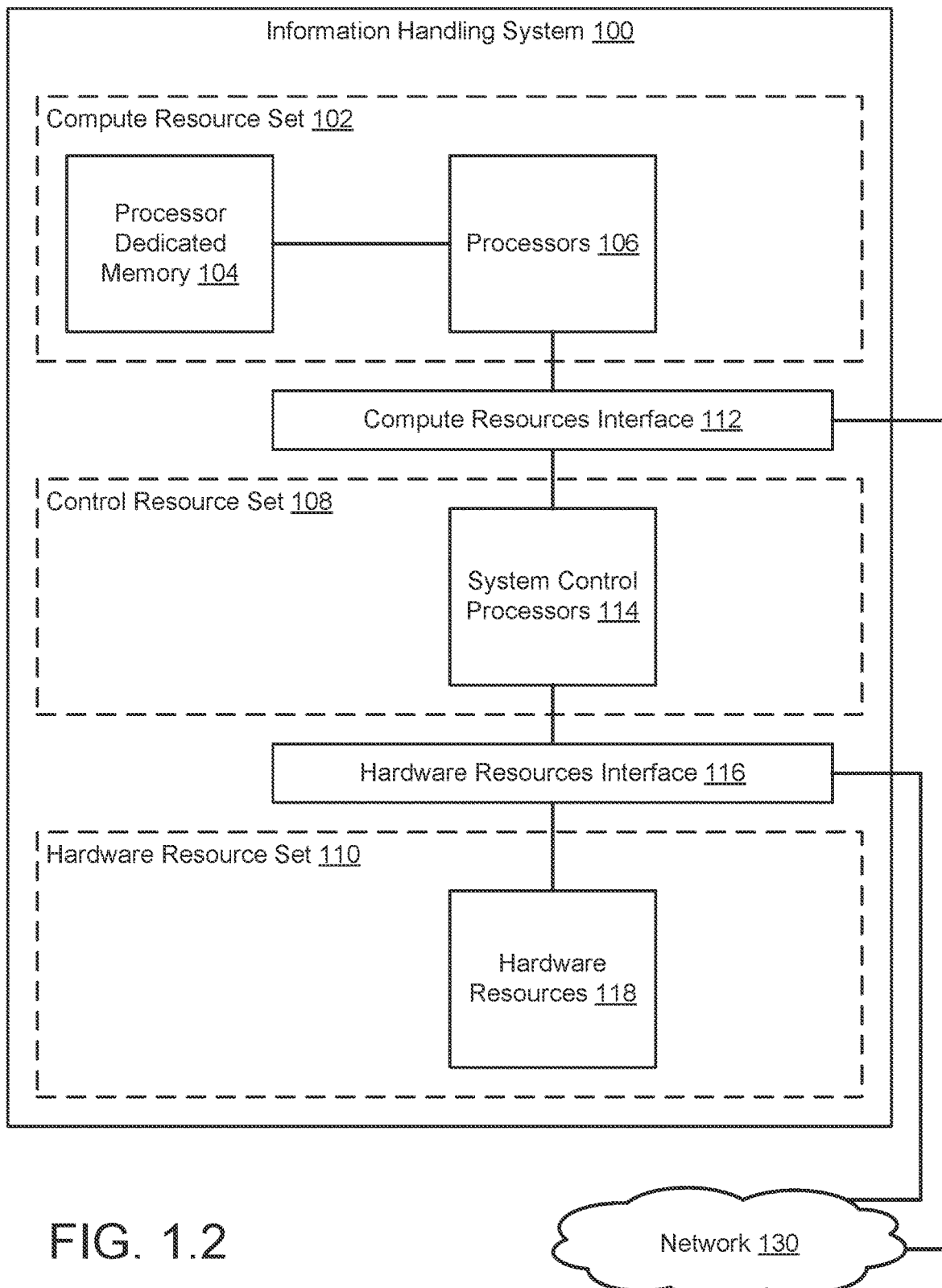
FIG. 1.2

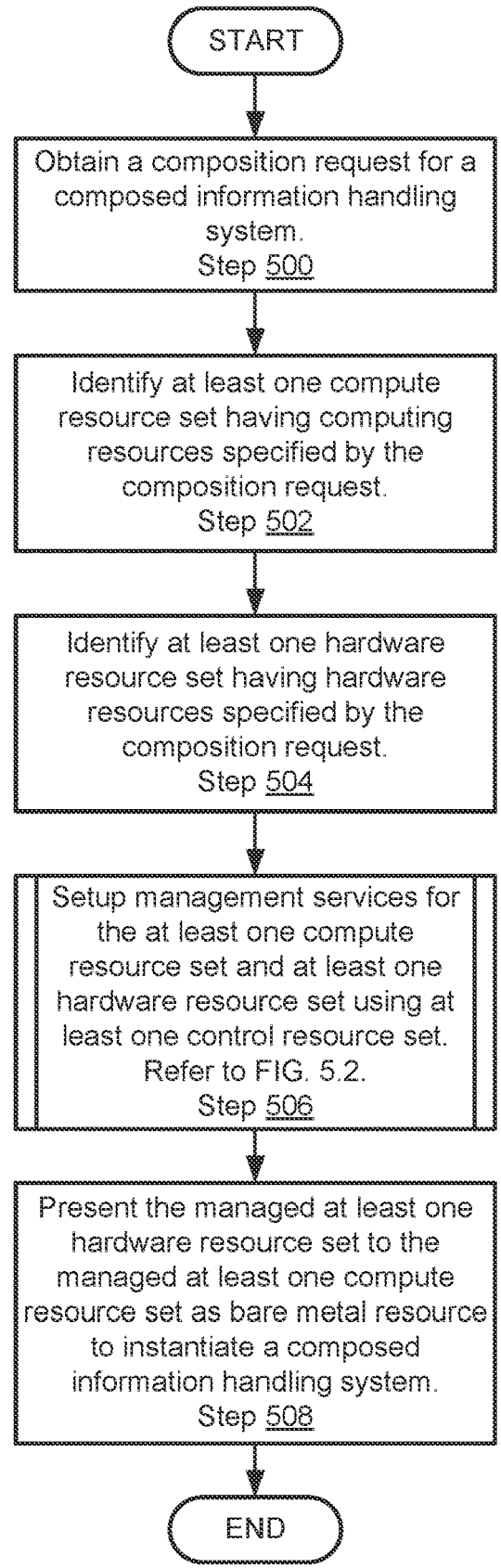
FIG. 5.1

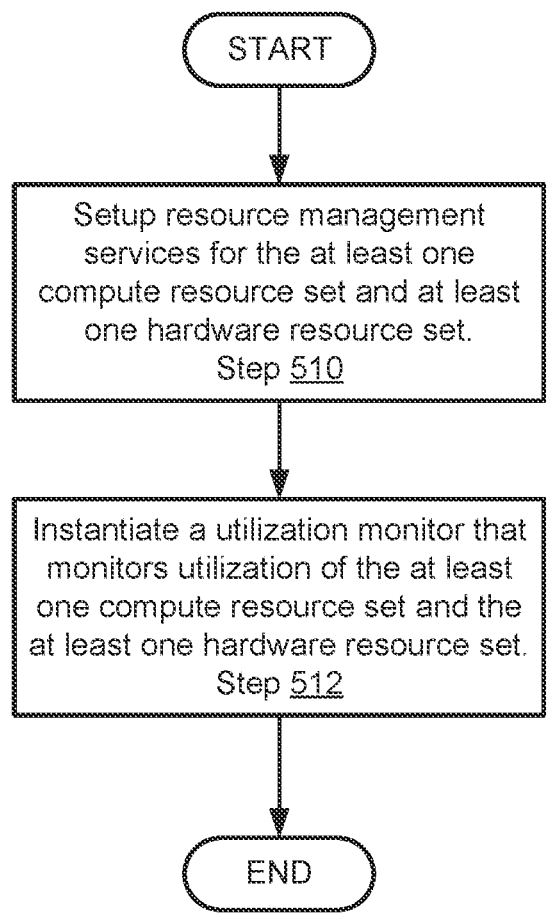
FIG. 5.2

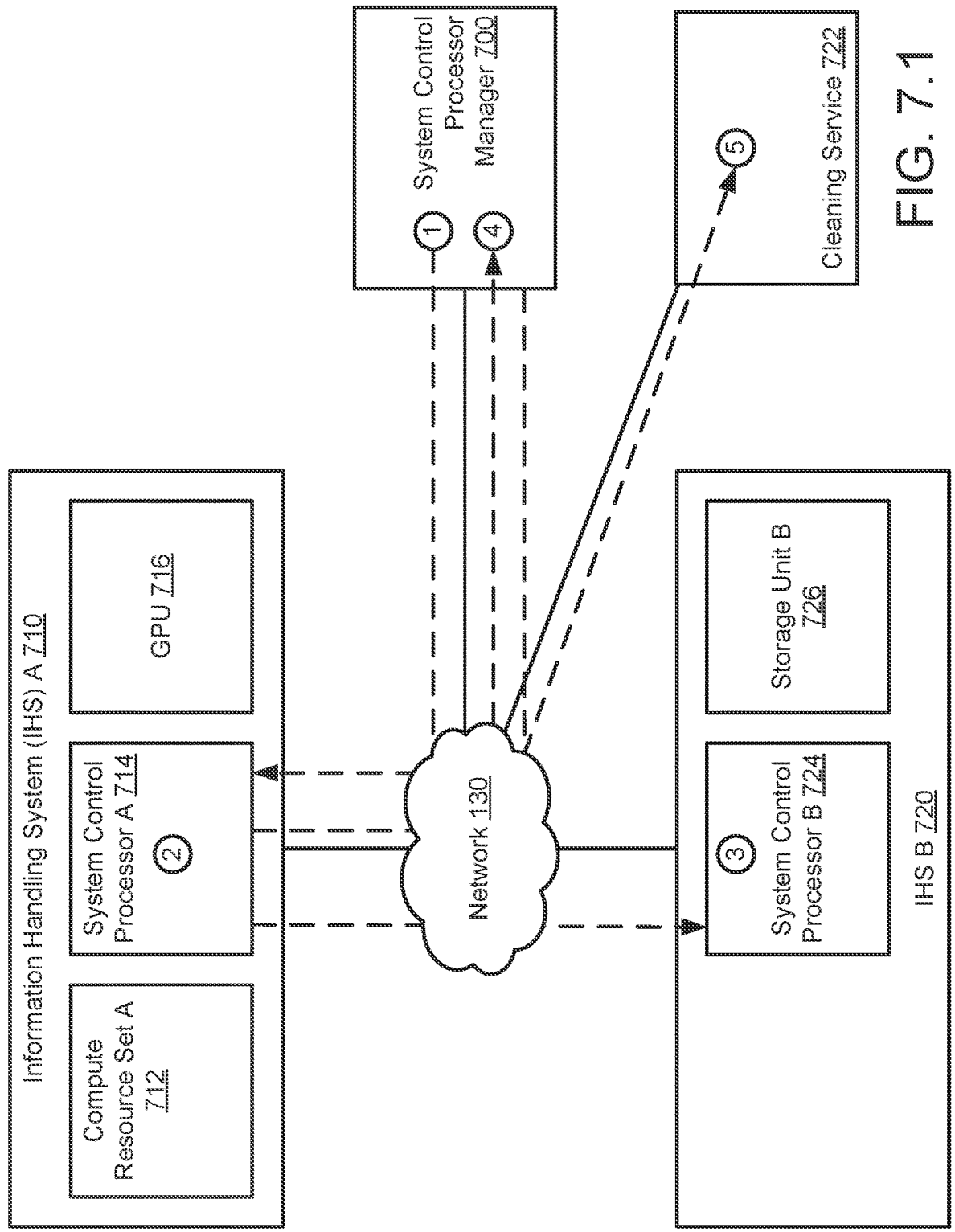
FIG. 7.1

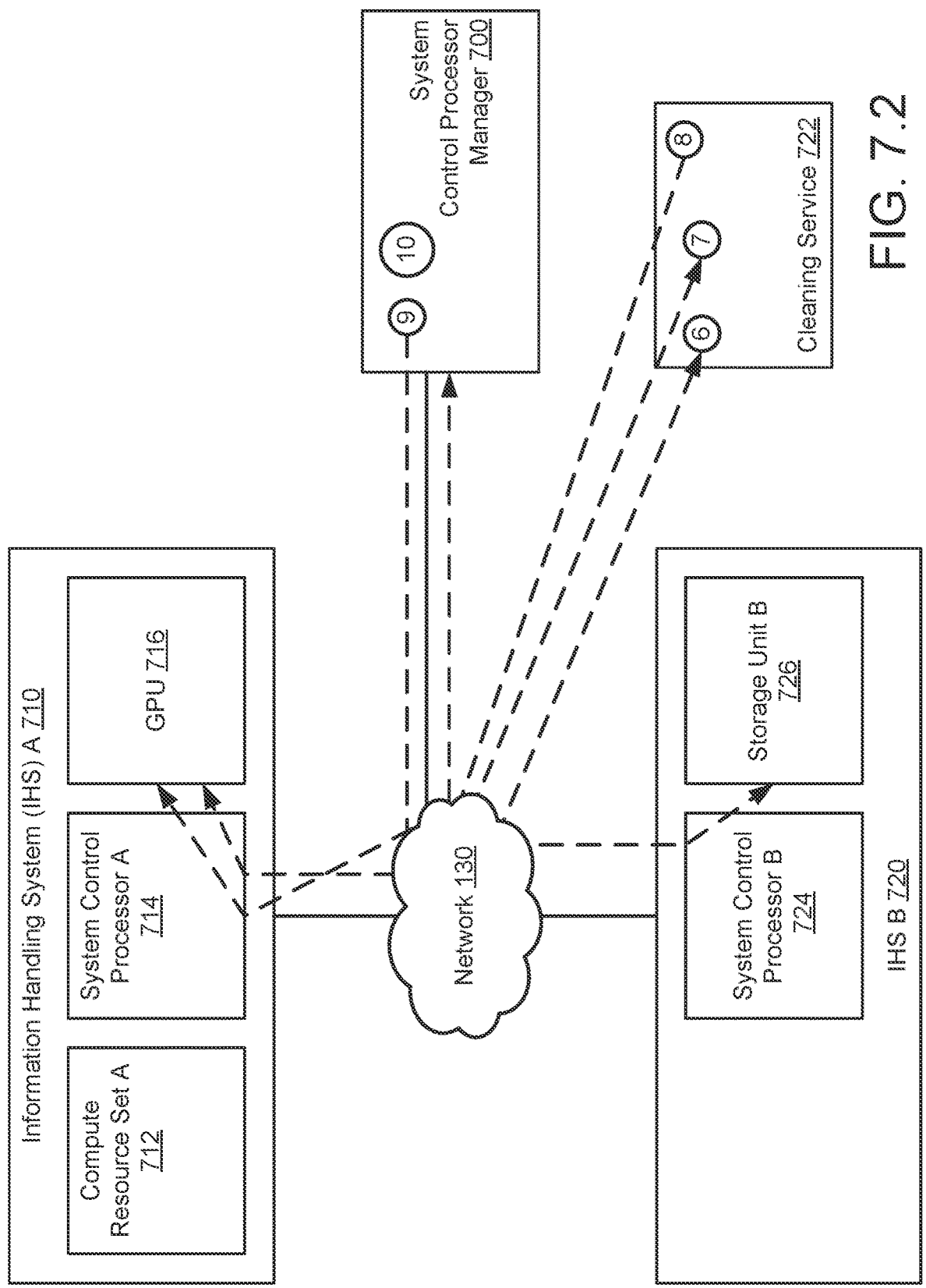
FIG. 7.2

METHOD AND SYSTEM TO PLACE RESOURCES IN A KNOWN STATE TO BE USED IN A COMPOSED INFORMATION HANDLING SYSTEM

BACKGROUND

Computing devices may provide services. To provide the services, the computing devices may include hardware components and software components. The services provided by the computing devices may be limited by these components.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of instantiating a composed information handling system based on a composition request in accordance with one or more embodiments of the invention.

FIG. 5.2 shows a flowchart of a method of setting up management services in accordance with one or more embodiments of the invention.

FIGS. 7.1-7.2 show diagrams of the operation of a second example system over time in accordance with one or more embodiments of the invention.

DETAILED DESCRIPTION

Figure 2:
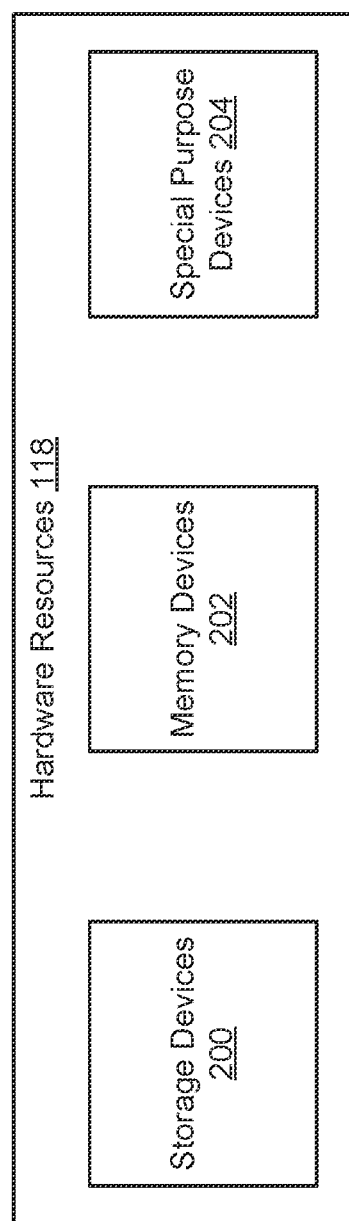
FIG. 2 shows a diagram of hardware resources in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, resources may need to be allocated for the performance of the services. The resources may include, for example, compute resources, control resources, and hardware resources.

To allocate the resources, composed information handling systems may be instantiated. A composed information handling system may be a device (the components of which may be distributed across one or more information handling systems) that has exclusive use over a quantity of resources. Resources from multiple information handling systems may be allocated to a composed information handling system, thereby enabling a composed information handling system to utilize resources from any number of information handling systems, for the performance of corresponding computer implemented services.

To allocate resources, the system may include a system control processor manager. The system control processor manager may include functionality to place resources in a known state (e.g., in an allocatable state), to service composition requests to allocate resources (which are in an allocatable state) to a composed information handling system, to service decomposition requests to release resources from the information handling system and place the released resources into a cleaning state, initiating a cleaning operation (as appropriate on the released resources), and set or confirm that the resource is configured in a known state, and once the cleaning (if required to be performed) and the configuration is in a known state, transitioning the resources back in to an allocatable state.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize resources provided by hardware resources. The resources may include, for example, processing resources, storage resources, memory resources, graphics processing resources, communications resources, and/or other types of resources provided by the hardware resources. Various hardware resources may provide these resources.

The type and quantity of resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, resources may be used inefficiently if the quantity of resources are over-allocated for the computer implemented services. Similarly, the quality of the provided computer implemented services may be poor or otherwise undesirable if resources are under-allocated for the computer implemented services.

Clients (40) may request that the computer implemented services be provided. For example, the clients (40) may send requests to management entities to have the computer implemented services be provided.

In general, embodiments of the invention relate to system, methods, and devices for managing the hardware resources of the information handling systems (60) and/or other resources (e.g., external resources (30)) to provide computer implemented services. The hardware resources of the information handling systems (60) may be managed by instantiating one or more composed information handling systems using the hardware resources of the information handling systems (60), external resources (30), and/or other types of hardware resources operably connected to the information handling systems (60). Consequently, the resources allocated to a composed information handling system may be tailored to the specific needs of the services that will be provided by the composed information handling system.

Overtime, the quantity of resources necessary to provide the computer implemented services may change. In such scenarios, the resource allocations for providing the services may be modified. For example, additional resources may be added to existing composed information handling systems (e.g., when over-loaded), resources may be removed from existing composed information handling systems (e.g., when under-loaded), and/or new composed information handling systems may be instantiated so that some of the existing workloads hosted by composed information handling systems can be transferred to the new composed information handling systems. By doing so, embodiments of the invention may improve the likelihood that computer implemented services are provided in a manner that meets the expectations of the clients (40).

In one or more embodiments of the invention, the system includes a system control processor manager (50). The system control processor manager (50) may provide composed information handling system composition services. Composed information handling system composition services may include (i) obtaining composition requests for composed information handling systems from, for example, the clients (40), (ii) aggregating resources from the information handling systems (60) and/or external resources (30) using system control processors to service the composition requests by instantiating composed information handling systems in accordance with the requests, and (iii) modifying existing resource allocations (including, via, servicing decomposition requests) for composed information handling systems. By doing so, instantiated composed information handling systems may provide computer implemented services in accordance with the expectations of the clients.

To determine the utilization of the resources of the information handling systems (60), performance of workloads, or other indicators regarding the quality of computer implemented services provided by composed information handling systems, the system control processor manager (50) may instruct system control processors of the composed information handling systems to monitor the use of hardware resources by the clients (40). This information may be used, for example, to ascertain whether additional or fewer resources should be allocated to the composed information handling systems, to identify whether new composed information handling systems should be instantiated, and/or for other purposes.

In one or more embodiments of the invention, the system control processor manager (50) instantiates composed information handling systems in accordance with a three resource set model. As will be discussed in greater detail below, the resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the resources of an information handling system into these resource sets, different quantities and types of resources may be allocated to each composed information handling system thereby enabling the resources allocated to the respective information handling system to match performed workloads. Further, dividing the resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For example, utilization monitors may be deployed in control resource sets to monitor the use of the other resource sets. Accordingly, use of these resources for providing computer implemented services requested by the clients (40) may be uniformly monitored across the information handling systems (60). For additional details regarding the system control processor manager (50), refer to FIG. 4.

In one or more embodiments of the invention, a composed information handling system is a device that is formed using all, or a portion, of the resources of the information handling systems (60), the external resources (30), and/or other types of hardware resources operably connected to the information handling systems (60). The composed information handling system may utilize the resources allocated to it to provide computer implemented services. For example, the composed information handling system may host one or more applications that utilize the resources assigned to the composed information handling system. The applications may provide the computer implemented services. Thus, the quality of the computer implemented services may be limited based on the allocation of resources to the composed information handling systems.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the resources of an information handling system, may perform actions on behalf of the system control processor manager (50) to aggregate resources together, may monitor the utilization of resources for providing computer implemented services requested by the clients (40), and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. Accordingly, by utilizing system control processors to monitor the use of the resources of a composed information handling system, applications or other entities hosted by the composed information handling system may not be able to view, be aware, impact, or otherwise influence the collection of computing resource use data. Accordingly, relevant information that may be used to decide how to allocate resources may be obtain in a manner that is transparent to the composed information handling systems. For additional details regarding the information handling systems (60), refer to FIG. 1.2.

The external resources (30) may provide resources that may be allocated for use by composed information handling systems. For example, the external resources (30) may include hardware resources that provide any number and type of resources. The composed information handling system may use these resources to provide their functionalities. For example, system control processors may operably connect to and manage the external resources (30) to provide additional and/or different resources from those available to be provided only using hardware resource sets of information handling systems. By utilizing system control processors to manage these resources, the use of these external resources (30) for providing services requested by the clients (40) may also be efficiently and transparently monitored.

Different external resources (e.g., 32, 34) may provide similar or different resources. For example, some external resources may include large numbers of hard disk drives to provide storage resources while other may include graphics processing unit rendering farms. The external resources (30) may include any number and type of resources for allocation to composed information handling systems via system control processors of control resource sets.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The clients (40), system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5.1-6. The clients (40), system control processor manager (50), information handling systems (60), and/or external resources (30) may be implemented using other types of computing devices without departing from the invention. For additional details regarding computing devices, refer to FIG. 8.

While the system of FIG. 1.1 has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware resources (also referred to as resources) including, for example, one or more processors (106), any quantity and type of processor dedicated memory (104), one or more system control processors (114), and any number of hardware resources (118). These hardware resources may be logically divided into three resource sets including a compute resource set (102), a control resource set (108), and a hardware resource set (110).

The control resource set (108) of the information handling system (100) may facilitate formation of composed information handling systems. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a control resource set is instructed to instantiate a composed information handling system including a compute resource set and a hardware resource set that will contribute storage resources to the compute resource set. The control resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources (e.g., the compute resource set may send bare metal communications to the control resource set, the control resource set may translate those bare metal communications into prepared resource compatible communications, and the control resource set may send the prepared resource compatible communications to the hardware resource set).

The control resource set (108) may also enable the utilization of any of the hardware components of the information handling system (100) by respective clients. When a composed information handling system is instantiated, it (and its hardware resources) may be utilized by a client by enabling the client to load application onto the composed information handling system. For example, the client may cause the composed information handling system to execute applications on the compute resource set (102) which, in turn, may utilize any number of hardware resource sets (e.g., 110) as part of their execution.

Because the control resource set (108) may mediate utilization of hardware resource sets (110) by compute resource sets (102), the control resource set (108) may transparently ascertain the use of the hardware resources of these resource sets, workloads being performed, and/or other information indicative of load states of the composed information handling systems (and/or quality of computer implemented services being provided by the composed information handling systems). To do so, the control resource set (108) may intercept (as part of presenting resources of hardware resource sets to compute resource sets) communications between resource sets, monitor workloads being performed by each of the respective resource sets, monitor power utilization by these resource sets, and/or may perform other actions to identify the use of these hardware resources by respective clients.

The collected use information may be used, for example, to ascertain whether additional resources should be added to composed information handling systems, to ascertain whether resources should be removed from composed information handling systems, to notify clients of their use of these resources (e.g., if the clients are being billed for use as part of a pay for use infrastructure deployment), to obtain information useable to estimate future computing resource requirements for hosting various applications and/or performing various types of workloads, and/or for other purposes.

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resource interface (112), which is also connected to the system control processors (114). The compute resource interface (112) may enable the processors (106) to communicate with other entities via bare metal communications. Also, the compute resource interface (112) may enable system control processors (114) of the control resource set (108) to monitor the activity of the processors (106) and/or processor dedicated memory (104) to identify use of these hardware resources by clients. For example, the compute resources interface (112) may support sideband communications to the hardware resources of the compute resource set (102) thereby enabling utilization information for these hardware resources to be obtained by the system control processors (114).

The system control processors (114) of the control resource set (108) may present resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources (e.g., resources of the hardware resource set (110)), external resources, other hardware resource sets of other information handling systems, etc.) to the compute resource set (102).

By presenting the resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware resources providing the resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and management may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize resources presented through one or more layers of indirection, abstraction, virtualization, etc. In other words, an indirect use of hardware resources and resources provided thereby. In the information handling system of FIG. 1.2, the system control processors (114) may present abstracted resources, indirection layers, virtualization layers, etc. as bare metal resources, In one or more embodiments of the invention, data plane entities directly utilize resources. For example, data plane entities may instruct hardware resources on their operation thereby directly utilizing resources provided thereby. Data plane entities may present the resources to control plane entities using one or more layers of indirection, abstraction, virtualization, etc.

The system control processors (114) may present any number of resources operably connected to it (e.g., the hardware resource set (110)), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented resources.

For example, the hardware resource set (110) may include hardware resources (118) operably connected to the system control processors (114) via a hardware resources interface (116). The hardware resources (118) may include any number and type of hardware resources that provide resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

The system control processors (114), by presenting resources to the compute resource set (102), may be able to monitor the utilization of the presented resources in a manner that is transparent to the applications or other entities executing using the processors (106). Consequently, these entities may not be able to interfere with monitoring of the use of these resources. In contrast, if an agent or other entity for monitoring computing resource use rates is executing using the processors (106), other entities executing using the processors (106) may be able to interfere with the operation of the monitoring entity. Accordingly, embodiments of the invention may provide a method of monitoring resources use that is less susceptible to interference by other entities. By doing so, resource allocation decisions made based on the collected information may better reflect the actual use of resources by the composed information handling systems.

Figure 3:
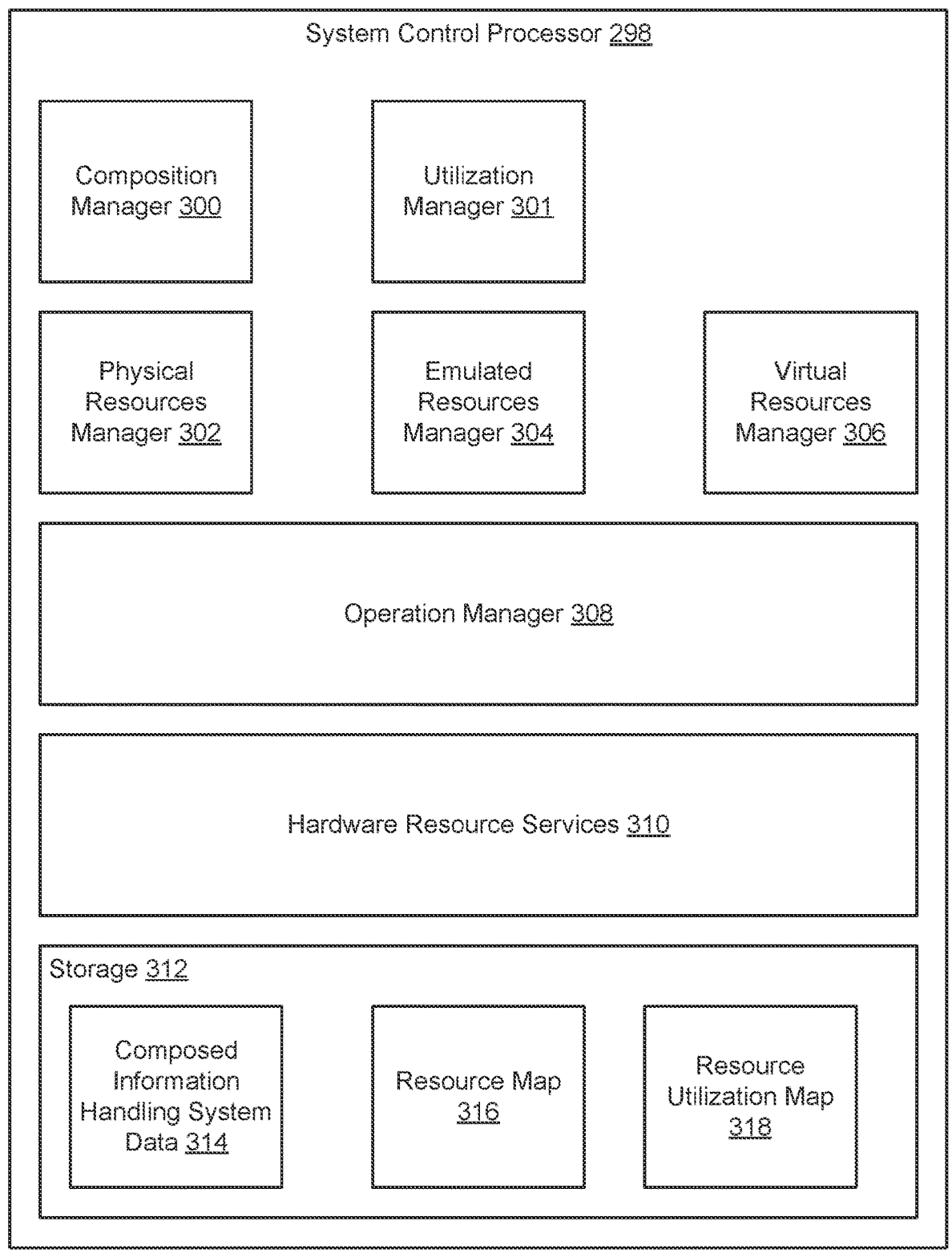
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware resources including circuitry adapted to provide the functionality of the compute resources interface (112).

The compute resources interface (112) may also support sideband communications between the system control processors (114), the processors (106), and/or the processor dedicated memory (104). Consequently, the system control processors (114) may be able to monitor the operations of these other devices to identify the utilization of these hardware resources by clients, identify workloads being performed by these devices, etc.

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware resources including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware resources of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-6. The information handling system (100) may be implemented using other types of computing devices without departing from the invention. For additional details regarding computing devices, refer to FIG. 8.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware resources that may provide any quantity and type of resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as storage class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of resources (e.g., graphics processing resources, computation acceleration resources, etc.) to composed information handling systems. The special purpose devices (204) may include any type and quantity of devices for providing other types of resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, field programmable gate arrays to perform customized computing functionalities, etc. The special purpose devices (204) may include other types of devices for providing other types of resources without departing from the invention.

The system control processors of the information handling systems may mediate presentation of the resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the resources of the hardware resources (118) may be finely, or at a macro level, allocated to different composed information handling systems.

Additionally, the system control processors may manage operation of these hardware resources in accordance with one or more models including, for example, data protection models, security models, workload performance availability models, reporting models, etc. For example, the system control processors may cause multiple copies of data to be redundantly stored, to be stored with error correction code, and/or other information usable for data integrity purposes.

The manner of operation of these devices may be transparent to the computing resource sets utilizing these hardware resources for providing computer implemented services. Consequently, even though the resulting composed information handling system control plane may be unaware of the implementation of these models, the composed information handling systems may still operate in accordance with these models thereby providing a unified method of managing the operation of composed information handling systems.

Further, the system control processors may monitor the use of these hardware resources by clients. As will be discussed below, the system control processors may host applications that monitor communications indicative of utilization of these hardware resources to determine whether additional resources should be allocated to them, whether resources should be deallocated from them, whether new instances of composed information handling systems should be instantiated, etc.

While the hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation, reallocation of resources to/from composed systems, operation, and decomposition of composed information handling systems. By doing so, a system that includes information handling systems may dynamically instantiate, recompose (and decompose composed information handling systems.

To perform one or more of the aforementioned functionalities for/to the composed information handling systems, the system control processor (298) may include a composition manager (300), a utilization manager (301), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating, operating, and decomposing composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (viii) add/remove/modify resources presented to the compute resource sets of composed information handling systems dynamically in accordance with workloads being performed by the composed information handling systems, (viii) coordinate with other system control processors to provide distributed system functionalities and/or transfer performance of applications and/or computer implemented services between composed information handling systems; and/or (ix) take steps to, e.g., gracefully, stop execution of one or more resources that make up a composed information handling system as part of servicing decomposition requests received by the system control processor manager (see e.g., FIG. 6). By providing the above functionalities, a system control processor in accordance with one or more embodiments of the invention may enable distributed resources from any number of information handling systems to be aggregated into a composed information handling system to provide computer implemented services meeting the expectations of clients.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of resources to be allocated to a composed information handling system.

In one or more embodiments of the invention, the composition requests specify the computing resource allocations using an intent based model. For example, rather than specifying specific hardware resources (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., IO from the processors that presumes a direct connection to another hardware resource) and respond in a manner consistent with responses of corresponding bare metal devices (e.g., memory). When doing so, the system control processor (298) may translate the communications into actions. The actions may be provided to the hardware resources used by the system control processor (298) to present the bare metal resources to the compute resource set(s). In turn, the hardware resources may perform the actions which results in a composed information handling system providing desired computer implemented services.

In some scenarios, multiple system control processors may cooperate to present bare metal resources to a compute resource set. For example, a single information handling system may not include sufficient hardware resources to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

In addition to enabling the composition of composed information handling system the composition manager (300) may also include functionality to decompose all or a portion of a composed information handling system. The decomposition of a composed information handling system results in all or a portion of the resources that are part of a composed information handling system into a cleaning state. Additional detail is provided in FIG. 6.

When providing its functionality, the composition manager (300) may perform all, or a portion, of the methods illustrated in FIGS. 5.1-6.

After a composed information handling system is formed, a client may begin to utilize the hardware resources of the composed information handling system by causing desired computer implemented services to be provided using the hardware resources. The utilization manager (301) may monitor the use of these hardware resources by the client to ascertain whether the services provided using these hardware resources meet the expectations of the client.

To do so, the utilization manager (301) may (i) monitor the components of the compute resource sets including the actions being performed, power being consumed, communications sent, etc., (ii) monitor communications from the compute resource sets destined for other hardware resources (e.g., of hardware resource sets, other compute resource sets of other information handling systems, external resources, etc.) by intercepting them as they traverse the system control processor (298), (iii) based on the intercepted communications, estimate use rates of these hardware resources by the client, (iv) store the use rate information, (v) provide the use rate information, and/or (vi) perform action sets based on the use rate information and/or actions specified by management entities. The action sets may include, for example, modifying the resources allocated to a composed information handling system, instantiating new composed information handling systems, transferring workloads/applications/computer implemented services to other composed information handling systems (and/or from other composed information handling systems to the composed information handling system including the system control processor), and/or perform other actions that cause the computer implemented services provided by the composed information handling systems better meet client expectations.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system(s) allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications (e.g., to obtain address translation tables, emulation tables, etc.).

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware resources of a compute resource set may be compatible with different types of hardware resources. Consequently, resources allocated to provide bare metal resources may not necessarily be compatible with the hardware resources of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware resources), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), utilization manager (301), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware resources of hardware resource sets. The hardware resource services (310) may be invoked by, for example, the operation manager (308).

When providing their functionalities, any of the aforementioned components of the system control processor (298) may perform all, or a portion, of the methods illustrated in FIGS. 5.1-6.

The system control processor (298) may be implemented using computing devices. The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-6. The system control processor (298) may be implemented using other types of computing devices without departing from the invention. For additional details regarding computing devices, refer to FIG. 8.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, any of the composition manager (300), utilization manager (301), physical resources manager (302), emulated resources manager (304), virtual resources manager (306), operation manager (308), and/or hardware resource services (310) are implemented using a hardware resource including circuitry. The hardware resource may be, for example, a digital signal processor, a field programmable gate array, or an application specific integrated circuit. The circuitry may be adapted to cause the hardware resource to perform the functionality of the composition manager (300), utilization manager (301), physical resources manager (302), emulated resources manager (304), virtual resources manager (306), operation manager (308), and/or hardware resource services (310). The composition manager (300), utilization manager (301), physical resources manager (302), emulated resources manager (304), virtual resources manager (306), operation manager (308), and/or hardware resource services (310) may be implemented using other types of hardware resources without departing from the invention.

In one or more embodiments of the invention, any of the composition manager (300), utilization manager (301), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), utilization manager (301), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware resources for processing digital information without departing from the invention.

As used herein, an entity that is programmed to perform a function (e.g., step, action, etc.) refers to one or more hardware resources (e.g., processors, digital signal processors, field programmable gate arrays, application specific integrated circuits, etc.) that provide the function. The hardware resources may be programmed to do so by, for example, being able to execute computer instructions (e.g., computer code) that cause the hardware resources to provide the function. In another example, the hardware resource may be programmed to do so by having circuitry that has been adapted (e.g., modified) to perform the function. An entity that is programmed to perform a function does not include computer instructions in isolation from any hardware resources. Computer instructions may be used to program a hardware resource that, when programmed, provides the function.

In one or more embodiments disclosed herein, the storage (312) is implemented using physical devices that provide data storage services (e.g., storing data and providing copies of previously stored data). The devices that provide data storage services may include hardware resources and/or logical devices. For example, storage (312) may include any quantity and/or combination of memory devices (i.e., volatile storage), long term storage devices (i.e., persistent storage), other types of hardware resources that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware resource that allocates the storage resources of the physical storage devices.

The storage (312) may store data structures including, for example, composed information handling system data (314), a resource map (316), and a resource utilization map (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware resources, virtualized devices, etc.) available for allocation (i.e., in an allocatable state, see e.g., FIGS. 5.1-6) and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The resource utilization map (318) may be implemented using one or more data structures that includes information regarding the utilization of hardware resources of the composed information handling systems, workloads being performed by the hardware resources, and/or other types of information that may be used to ascertain the quality of computer implemented services being provided by a composed information handling system. For example, the resource utilization map (318) may specify identifiers of hardware resources of a composed information handling system, the workloads being performed by these hardware resources, the utilization rates of these hardware resources, etc.

The resource utilization map (318) may specify the resource utilization via any method. For example, the resource utilization map (318) map may specify a quantity of utilization, resource utilization rates over time, power consumption of hardware resources while utilized to provide the computer implemented services, workload (and/or statuses) performed using hardware resources, etc. The resource utilization map (318) may include other types of information used to quantify the quality of computer implemented services provided without departing from the invention.

The resource utilization map (318) may be maintained by, for example, the utilization manager (301). For example, the utilization manager (301) may add, remove, and/or modify information included in the resource utilization map (318) to cause the information included in the resource utilization map (318) to reflect the current utilization of the composed information handling systems.

The data structures of the resource utilization map (318) may be implemented using, for example, lists, tables, unstructured data, databases, etc. While illustrated in FIG. 3 as being stored locally, the resource utilization map (318) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
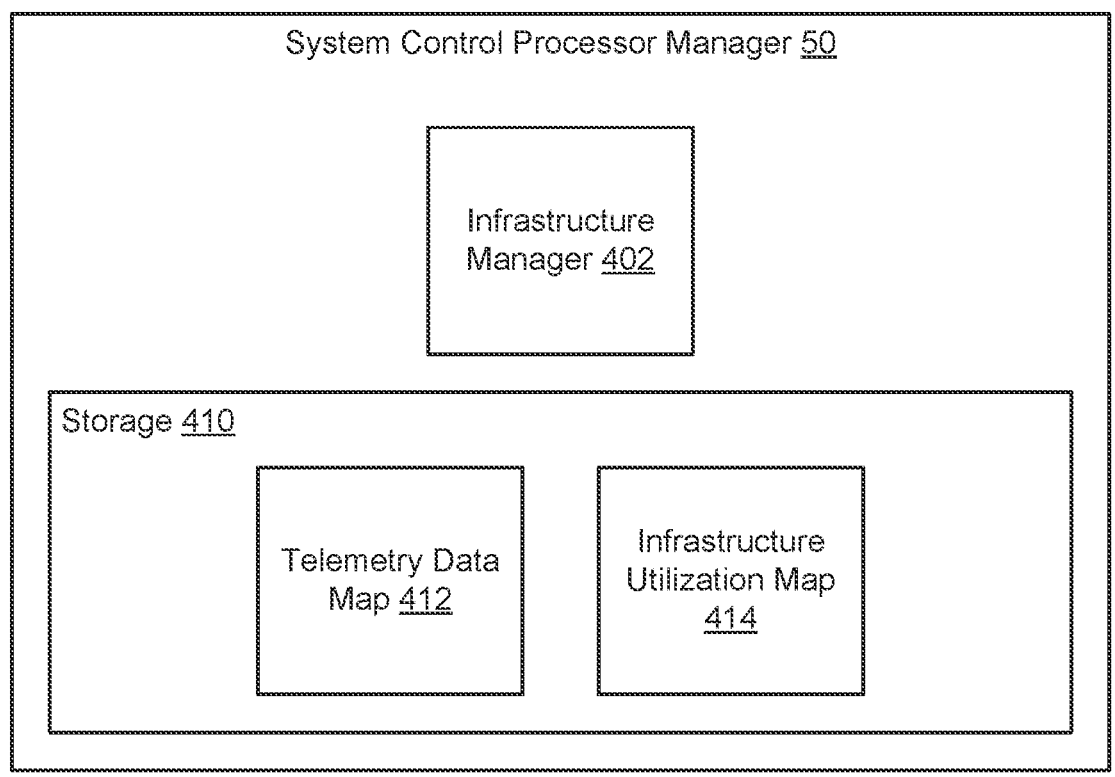
FIG. 4 shows a diagram of a system control processor manager in accordance with one or more embodiments of the invention.

As discussed above, a system control processor manager may cooperate with system control processors of control resource sets to instantiate composed information handling systems by presenting resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems and recomposing composed information handling systems over time. To do so, the system control processor manager (50) may include an infrastructure manager (402), and storage (410). Each of these components is discussed below.

The infrastructure manager (402) may provide composition services. Composition services may include obtaining composition, recomposition, and/or decomposition requests for composed information handling systems, determining the resources to allocate to instantiate composed information handling systems, add/remove resources to recompose/decompose all or a portion of a composed information handling systems, manage transfers of workloads between composed information handling systems for recomposition purposes, and cooperating with system control processors to allocate the identified resources. By doing so, the infrastructure manager (402) may cause any number of computer implemented services to be provided using the composed information handling systems.

To determine the resources to allocate to new composed information handling systems, the infrastructure manager (402) may employ an intent based model that translates an intent expressed in a composition request to one more allocations of resources. For example, the infrastructure manager (402) may match an expressed intent to resources to be allocated to satisfy that intent. A lookup table may specify the type, quantity, method of management, and/or other information regarding any number of resources that when aggregated will be able to satisfy a corresponding intent. The infrastructure manager (402) may identify resources for allocation to satisfy composition requests via other methods without departing from the invention.

To recompose composed information handling systems, the infrastructure manager (402) may add or remove resources from existing composed information handling systems or instantiate new composed information handling systems and transfer workloads from existing composed information handling systems to the new composed information handling systems. Consequently, the composed information handling systems performing the workloads may have different amounts and/or types of resources after being recomposed.

In some embodiments of the invention, the infrastructure manager (402) may recompose deployments. A deployment may be a group of composed information handling systems performing a predetermined function. In such a scenario, the infrastructure manager (402) may recompose one or more of the composed information handling systems of the deployment to recompose the deployment.

The infrastructure manager (402) may recompose infrastructure (e.g., deployments, individual composed information handling systems, etc.) in response to recomposition requests.

To decompose composed information handling systems, the infrastructure manager (402) identify all or a portion of the resources from a composed information handling systems to be deallocated, transfer workloads from composed information handling systems of which one or more resources are to be deallocated, deallocate, after the transfer of the workload, the aforementioned identified resources.

To cooperate with the system control processors for composed information handling system composition, recomposition purposes and/or decomposition purposes, the infrastructure manager (402) may obtain telemetry data regarding the resources of any number of information handling systems and/or external resources that are available for allocation. The infrastructure manager (402) may aggregate this data in a telemetry data map (412) which may be subsequently used to identify resources of any number of information handling systems and/or external resources to satisfy composition, recomposition request and/or decomposition requests.

When the infrastructure manager (402) identifies the resources to be allocated (i.e., resources in an allocatable state), the infrastructure manager (402) may communicate with any number of system control processors (e.g., of control resource sets of information handling systems) to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated recomposed and/or decomposed, the infrastructure manager (402) may add information reflecting the resources allocated to composed information handling systems, the workloads being performed by the composed information handling systems, the state of the resources (e.g., allocatable, allocated, cleaning) and/or other types of information to an infrastructure utilization map (414). The infrastructure manager (402) may utilize this information to, for example, decide whether resources should be added to or removed from composed information handling systems. Consequently, resources may be dynamically re-provisioned to meet changing workloads imposed on composed information handling systems.

In one or more embodiments of the invention, the infrastructure manager (402) is implemented using a hardware resource including circuitry. The hardware resource may be, for example, a digital signal processor, a field programmable gate array, or an application specific integrated circuit. The circuitry may be adapted to cause the hardware resource to perform the functionality of the infrastructure manager (402). The infrastructure manager (402) may be implemented using other types of hardware resources without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware resources for processing digital information without departing from the invention.

When providing its functionality, the infrastructure manager (402) may perform all, or a portion, of the methods illustrated in FIGS. 5.1-6.

In one or more embodiments disclosed herein, the storage (410) is implemented using physical devices that provide data storage services (e.g., storing data and providing copies of previously stored data). The devices that provide data storage services may include hardware resources and/or logical devices. For example, storage (410) may include any quantity and/or combination of memory devices (i.e., volatile storage), long term storage devices (i.e., persistent storage), other types of hardware resources that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware resource that allocates the storage resources of the physical storage devices.

The storage (410) may store data structures including, for example, the telemetry data map (412) and the infrastructure utilization map (414). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling system by dynamically allocating and deallocating resources for the composed information handling systems.

As discussed above, the system of FIG. 1.1 may provide computer implemented services using composed information handling systems. FIGS. 5.1-5.2 show methods that may be performed by components of the system of FIG. 1.1 to manage composed information handling systems.

FIG. 5.1 shows a flowchart of a method in accordance with one or more embodiments of the invention. The method depicted in FIG. 5.1 may be performed to provide computer implemented services using a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system is obtained. The composition request may be obtained using any method without departing from the invention. For example, the composition request may be obtained as part of a message from another entity operably connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of resources to be allocated to the composed information handling system. For example, the composition request may specify resources, memory resources, storage resources, graphics processing resources, compute acceleration resources, communications resources, etc. The list may include any type and quantity of resources.

In one or more embodiments of the invention, the composition request specifies how the resources are to be presented. For example, the composition request may specify virtualization, emulation, etc. for presenting the resources.

In one or more embodiments of the invention, the composition request specifies how the resources used to present the resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The methods employed by the system control processors may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processors. These connections may be used by the system control processors to present, as bare metal resources, resources from other information handling systems to compute resource set(s) of the composed information handling system.

For example, a system control processor of a first information handling system may manage a storage device as a virtualized resource. The system control processor may connect to a second system control processor which, in turn, is operably connected to a compute resource set. The second control processor may operate as a pass through for the system control processor while presenting the virtualized resource as a bare metal resource to the compute resource set. Consequently, when the compute resource set attempts to communicate with the storage, the compute resource set may send a bare metal communication to the system control processor, the system control processor may relay the bare metal communication to the second system control processor, and the second system control processor may processes the bare metal communication in accordance with its virtualization model (e.g., converting a logical block address to a physical block address in accordance with the virtualization model) to instruct the storage device to perform one or more actions to satisfy the bare metal communication.

In one or more embodiments of the invention, the composition request specifies a desired outcome. The desired outcome may be, for example, computer implemented services to be provided in response to the composition request. In another example, the desired outcome may be a list of applications to be hosted in response to the composition request. In other words, the composition request may specify a desired outcome without specifying the resources that are to be used to satisfy the requests, the methods of managing the resources, models employed to provide for data integrity/security/etc. Such a composition request may be referred to as an intent based composition request.

In step 502, at least one compute resource set having resources specified by the composition request is identified. The at least one compute resource set may be identified by matching the resources specified by the composition request to at least one compute resource set having those resources using a telemetry data map (412, FIG. 4).

For example, the telemetry data map (412, FIG. 4) may specify a list of compute resource sets, identifiers of control resource sets that manage the listed compute resource sets, and the hardware resources of the listed compute resource sets. By matching the resources specified by the composition request to the hardware resources specified in the list, the compute resource set corresponding to the listed hardware resources may be identified as the at least one compute resource set.

If no compute resource set includes all of the resources specified by the composition request, multiple compute resource sets having sufficient hardware resources to meet the resources specified by the composition request may be identified as the at least one compute resource set.

However, the at least one compute resource set may not able to satisfy all of the resources specified by the composition request. As discussed above, compute resource sets may only include a limited number and type of hardware resources. Consequently, the at least one compute resource set may not be able to provide some of the resources (e.g., graphics processing, communications, etc.) specified by the composition request.

In step 504, at least one hardware resource set having hardware resources specified by the composition request is identified. The at least one hardware resource set may be identified similarly to that described with respect to the identified of the at least one compute resource set of step 502. For example, the resources requirements specified by the composition request may be matched to compute resource sets.

In step 506, management services for the at least one compute resource set and the at least one hardware resource set are setup using at least one control resource set. The management services may include, for example, virtualization, emulation, abstraction, indirection, and/or other type of services to meet the requirements of data integrity, security, and/or management models.

The management services may also include monitoring of the utilization of the hardware resources of the at least one compute resource set and the at least one hardware resource set. For example, the utilization monitor hosted by the system control processor of the at least one control resource set may be configured to perform the monitoring of the hardware resources of these sets. Consequently, the system may begin to monitor the use of these hardware resources by a client sent the composition request.

As discussed above, the utilization manager may be monitoring by communicating with the hardware resources of the at least one compute resource set via sideband communication, intercept communications from the at least one computing resource set directed toward the at least one hardware resource set to identify how the hardware resources of the at least compute resource set are using the hardware resources of the at least one hardware resource set, etc. Consequently, the monitored computing resource use may be transparent to entities executing using the at least one compute resource set.

The management services may be setup, in all or in part, via the method illustrated in FIG. 5.2.

In step 508, the managed at least one hardware resources are presented to the managed at least one compute resource set as bare metal resources using the at least one control resource set to instantiate the composed information handling system to service the composition request.

To present the managed at least one hardware resource set, the system control processor manager may instruct the system control processors of the at least control resource set to present the managed at least one hardware resource set as discoverable bare metal resources to the at least one compute resource set. For example, the at least one control resource set may send a bare metal communication to one or more processors of the managed at least one compute resource set to cause the processors to discover the presence of the presented bare metal resources. By doing so, the processors may then begin to utilize the managed at least one hardware resource set as bare metal resources resulting in a composed information handling system having all of the resources necessary to provide desired computer implemented services.

The method may end following step 508.

Using the method illustrated in FIG. 5.1, a composed information handling system may be formed using resources from one or more information handling systems and/or external resources in a manner that allows of use of the hardware resources of the composed information handling system to be monitored.

Turning to FIG. 5.2, FIG. 5.2 shows a flowchart of a method in accordance with one or more embodiments of the invention. The method depicted in FIG. 5.2 may be performed to setup management services in accordance with one or more embodiments of the invention. The method shown in FIG. 5.2 may be performed by, for example, a system control processor manager (e.g., 50, FIG. 1.1). Other components of the system in FIG. 1.1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, resource management services for the at least one compute resource set and the at least one hardware resource set are setup.

To setup the resource management services, the system control processor manager may cooperate with the at least one control resource set. For example, the system control processor manager may generate instructions for implementing the management services, encapsulate the instructions in a message, and send the message to one or more system control processors of the at least one control resource set. In response to receiving the message, the system control processors may implement the instructions thereby implementing any number of management services such as virtualization, emulation, etc.

The system control processor manager may also include identification information for the system control processors that will cooperate in presenting resources as part of instantiating a composed information handling system. Consequently, the system control processors of control resource sets that will facilitate bare metal presentation of resources to processors of compute resource sets of the composed information handling system may be able to identify each other, communicate with one another, etc.

Setting up management services for the hardware resource set may include, for example, preparing translation, indirection, or abstraction tables used to translate logical addresses provided by compute resource sets to physical addresses utilized by hardware resources of the hardware resource set.

In another example, setting up management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing management services may include instantiating a corresponding emulation layer between a hardware resource of the hardware resource set and the compute resource set. Consequently, bare metal communications between the compute resource set and the hardware resource used to present the bare metal resource to the compute resource set may be automatically translated by the system control processor.

Setting up management services may further include modifying the operation of one or more devices to provide, for example, data integrity functionality (e.g., RAID, ECC, etc.), security functionality (e.g., encryption), and/or other functionalities that are transparent to the composed information handling system.

By setting up management services, a managed at least one compute resource set and a managed at least one hardware resource set may be obtained.

In step 512, a utilization monitor that monitors utilization of the at least one compute resource set and the at least one hardware resource set is instantiated.

The utilization monitor may be instantiated by beginning execution of a utilization monitor on a system control processor of the at least one control resource set that manages presentation of the at least one hardware resource set to the at least one control resource set. The utilization monitor may then be configured (e.g., provided an identifier of the composed information handling system and components thereof that will be monitored by it) to monitor the use of resources of the composed information handling system, performance of applications by the composed information handling systems, and/or to otherwise obtain quality metric usable to determine whether the computer implemented services provided by the composed information handling system meets client expectations. If a utilization monitor is already executing on the system control processor, the existing instance of the utilization monitor may be configured to monitor the use of resources, application performance, etc. of the composed information handling system.

For example, the system control processor manager may generate instructions for beginning execution and/or configuration of the utilization monitor, encapsulate the instructions in a message, and send the message the system control processor. In response to receiving the message, the system control processor may implement the instructions thereby instantiating the utilization monitor and beginning monitoring of the use of the resources of the composed information handling system.

The method may end following step 512.

Using the method illustrated in FIG. 5.2, management services for a composed information handling system may be setup that allows for computing resource use information to be collected in a manner that is transparent to entities hosted by the composed information handling system. The aforementioned information may be utilized to identify whether computer implemented services provided by the composed information handling system meets client expectations.

Figure 6:
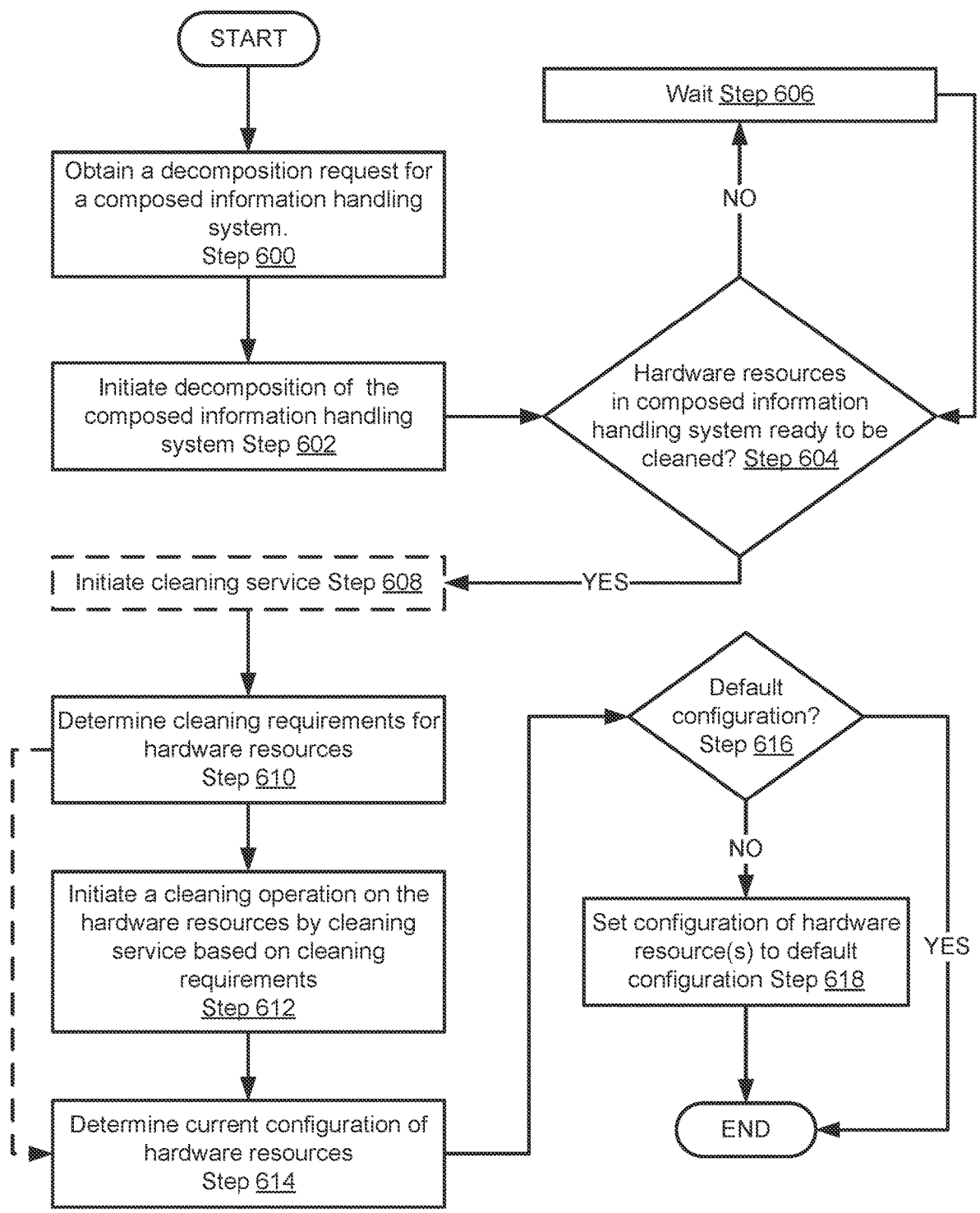
FIG. 6 shows a flowchart of a method of processing resources associated with a decomposed information handling system in accordance with one or more embodiments of the invention.

FIG. 6 shows a flowchart of a method in accordance with one or more embodiments of the invention. The method depicted in FIG. 6 may be performed to process resources associated with a decomposed information handling system in accordance with one or more embodiments of the invention. The method shown in FIG. 6 may be performed by, for example, a system control processor manager (e.g., 50, FIG. 1.1). Other components of the system in FIG. 1.1 may perform all, or a portion, of the method of FIG. 6 without departing from the invention.

In one or more embodiments of the invention, the resources that are used to create the composed systems may be utilized and/or accessible to multiple tenants. For example, a given storage device may be part of a first composed information handling system for a first tenant at a first period of time and be part of a second composed information handling system for a second tenant for a second period of time. In this scenario, during the first period of time, the first tenant may store data in the storage device, and then at a second point in time the second tenant will have access to the storage device. If no steps are taken to delete the first tenant's data from the storage device (or otherwise make it unreadable), the second tenant may be able to access the first tenant's data on the storage device. To address this potential security issue, embodiments of the invention implement the method shown in FIG. 6 to clean previously allocated resources, e.g., the storage device in the above example, prior to such resources being available to be allocated to another composed information handling system.

In addition to addressing the aforementioned security issue, to facilitate composition of composed information handling systems, the system control processor manager (and/or other components in the system) include functionality to determine a current configuration of a resource, obtain a default configuration for the resource (which may be specified by a tenant and/or any other entity), and then update (or initiate the update of) the configuration of the resource to the default configuration. Once the resource has been cleaned (if appropriate based on the type of resource), and its configuration has been set to a default configuration (if appropriate based on the type of resource), the resource may be set in an allocatable state (i.e., it is available for allocation in a composed information handling system). By setting the resource in a known state, the security issues noted above are addressed and further the system control processors, which will be aware that the resources are in a known default configuration. Therefore they are able to apply the appropriate configurations to the resources to place them in a state that allows them to be readily used in the composed information handling system. Said another way, because the resources will be in a known state (i.e., have a default configuration), the system control processors do not have to determine the configuration of the resources before deploying them in a composed information handling system. Rather, the system control processor can assume that the resources have a particular configuration because they are in an allocatable state and, based on this understanding, can efficiently take steps to deploy the resource. If there is no known state of the resource, then either the system controller processor takes additional steps to determine the configuration parameters, and then modify the configuration parameters prior to deploying the resource, or the system control processor deploys the resource without checking the state of the resource. In the latter case, if the configuration of the resource is not compatible with the other resources in the composed information handling system, then the composed information handling system may not operate as expected.

While FIG. 6 is illustrated as a series of steps, any of the steps may be omitted, performed in a different order, additional steps included, and/or any or all of the steps may be performed in a parallel, and/or partially overlapping manner without departing from the invention.

In step 600, a decomposition request is received for a composed information handling system. The decomposition request may specify that all or a portion of a given composed information handling system needs to be decomposed.

In step 602, decomposition of the composed information handling system (or a portion of it thereof) is initiated. The initiation of the decomposition may include identifying the resources that are part of the composed system, and then sending instructions for the appropriate system control processors to deallocate the resource that they control and/or manage.

In one embodiment, the system control processor manager may instruct the composed information handling system (via the appropriate system control processors) to terminate the workload prior to the deallocation of the resources of the composed information handling system.

In another embodiment, the system control processor manager may initiate the transfer of the workload on the composed information handling system to another composed information handling system. Once the workload has been transferred, the system control processor may issue the instruction to deallocate the resources.

In one embodiment, the system control processor manager may instruct the composed information handling system (via the appropriate system control processors) to transfer the workload prior to deallocation the resources of the composed information handling system.

Once the composed information handling system has taken the appropriate steps with respect to terminating and/or transferring the workload, it deallocates the resources by placing them in a cleaning state. The state of these resources may be reflected in the resource map (316) and/or in the infrastructure utilization map (414). When a resource is in a cleaning state it may not be allocated to a new or existing composed information handling system.

In step 604, a determination is made about whether the resources in the composed handling system are ready to be cleaned. This determination is based on whether all resources that need to be decomposed are in a cleaning state. If the resources are still being transitioned from the allocated state to the cleaning state by the appropriate system control processors, then the process proceeds to step 606; otherwise, the process proceeds to step 608.

In step 606, the system control processor manager waits until the resources are ready to be cleaned (i.e., they are in a cleaning state).

In step 608, once the resources are in a cleaning state, a cleaning service may be initiated. In one embodiment of the invention, the cleaning service includes functionality to perform the appropriate cleaning operation on the resource. The result of performing the cleaning operation is to either (i) remove all user data from the resource or (ii) render the user data unreadable.

The cleaning service may be implemented on an information handling system (e.g., 50) or on a composed information handling system. In the latter case, the system may include an information handling system that is ready to perform the aforementioned functionality of the cleaning service (i.e., a dedicated information handling system). Alternatively, the cleaning service may be initiated on an information handling system or a composed information handling system only when the cleaning service is required (i.e., when there are resources to clean).

Accordingly, step 608 may only be performed if a cleaning service needs to initiated.

In step 610, the system control processor includes functionality to determine if a given resource needs to be cleaned (e.g., if the resource includes user data, i.e., data that was stored by a user of the composed information handling system) and, if so, determines the appropriate cleaning operation. The cleaning operation may include: (i) executing one or more specialized software applications to delete the user data from the resource, and/or to overwrite the user data on the resource with other data, or (ii) deleting an encryption key on the resource in scenarios in which the resource is a self-encrypting drive and all user data on the drive is stored as encrypted data using the encryption key. In the latter scenario, when the encryption key is deleted there is no other mechanism to convert the encrypted data to user data; thus, the user data is rendered unreadable. Other cleaning operations may be performed without departing from the invention. The cleaning operations may be specified on a per-resource basis, on a per-tenant basis, on any other basis, and/or any combination thereof.

If no cleaning operation is required, then the process proceeds to step 614.

In step 612, the system control processor instructs the cleaning service to perform the cleaning operation on the resource. In response to receiving this request, the cleaning service may connect (e.g., via a network) to the resource and then perform the appropriate cleaning operation. Once the cleaning operation has been performed, the cleaning service informs the system control processor manager that the cleaning operation has been completed and the system control processor updates the information in the infrastructure utilization map (414) to indicate that the cleaning operation has been completed.

In step 614, the system control processor manager determines the current configuration of the resource. The system control processor manager may use an application program interface (API) exposed by the resource to directly connect to the resource and obtain information about the resource. Alternatively, the system control processor manager may obtain the configuration information from the system control processor that is directly connected to the resource.

In step 616, a determination is made whether the configuration of the resource (i.e., based on information obtained in step 614) is the default configuration. The default configuration corresponds to a configuration that is set by a tenant or some other entity. The system control processor manager may store the information about the default configuration in the infrastructure utilization map (414), in another data structure, and/or obtain the default configuration from an external source. If the configuration of the resource is the default configuration or if there is no default configuration for the given resource, then the state of the resource is set to allocatable and the process ends; otherwise, the process proceeds to step 618.

In step 618, the system control processor manager uses an API exposed by the resource to directly connect to the resource and modify its configuration to the default configuration. Alternatively, the system control processor manager may obtain the configuration information from the system control processor that is directly connected to the resource. Once the configuration has been updated, the system control processor manager updates the information in the infrastructure utilization map (414) to set the state of the resource to allocatable.

If there are multiple resources to be processed, then steps 610-618 may be performed for each resource.

To further clarify embodiments of the invention, a non-limiting example is provided in FIGS. 7.1-7.2. Actions performed by components of the illustrated system are illustrated by numbered, circular boxes interconnected, in part, using dashed lines terminating in arrows. For the sake of brevity, only a limited number of components from the system of FIG. 1.1 is illustrated in FIGS. 7.1 and 7.2.

Example

FIGS. 7.1-7.2 show diagrams of the operation of an example system over time in accordance with one or more embodiments of the invention. Consider a scenario in which there are two information handling systems (IHS) (710, 720), where certain resources in each of these IHSs make up a composed IHS. More specifically, the composed IHS includes resource compute set A (712), GPU (716), and storage unit B (726). The composed IHS is managed by the system control processor manager (700), which manages the composed IHS via system control processor A and B (714, 724).

In this scenario, after the composed IHS is deployed and executing a workload, the system control processor manager (700) receives a decomposition request from an external entity (not shown). In response to the decomposition request, the system control processor manager (700) instructs system control processor A (714) to start deallocating the resources associated with the composed IHS [1]. System control processor A (714) takes steps to deallocate compute resource set A (712) and GPU (716); and instructs system control processor B (724) to deallocate storage unit B (726) [2]. System control processor B (724), in response to the instructions from system control processor A (714), takes steps to deallocate storage unit B (726) [3]. At this stage, the state of all of the resources in the composed IHS (which is now decomposed) is set to cleaning and system control processor A (714) notifies the system control processor manager (700) that the state of all of the resources in the composed IHS (which is now decomposed) is set to cleaning [4].

The system control processor manager (700) determines that compute resource set A (712) does not need to be cleaned (i.e., no cleaning operation is required) but that GPU (716) and storage unit B (726) need to be cleaned. For the GPU (716) the cleaning operation to be performed to clear its cache and the cleaning operation for storage unit B (726) is DoD 5220.22-M ECE. The system control processor manager (700) subsequently instructs the cleaning service (722) (which was previously instantiated on an IHS (not shown)) to perform the aforementioned cleaning operations [5].

Referring to FIG. 7.2, the cleaning service (722) connects to storage unit B (726) and performs the specified cleaning operation to render any user data on storage unit B (726) unreadable [6]. The cleaning service (722) connects to GPU (716) and performs the specified cleaning operation to clear the cache on the GPU (716) [7]. Once the cleaning operations are completed, the cleaning service (722) notifies the system control processor manager (700) [8].

The system control processor manager (700) then determines that the GPU (716) needs to be set to a default configuration and sends a request to get the current configuration of the GPU (716) [9]. The system control processor manager (700) determines that the current configuration of the GPU (716) matches the default configuration. Further, the system control processor manager (700) determines that no other resources that were deallocated need to have their configurations set to a default value. At this stage, the system control processor manager (700) sets the state of all of the resources to allocatable [10].

End of Example

Figure 8:
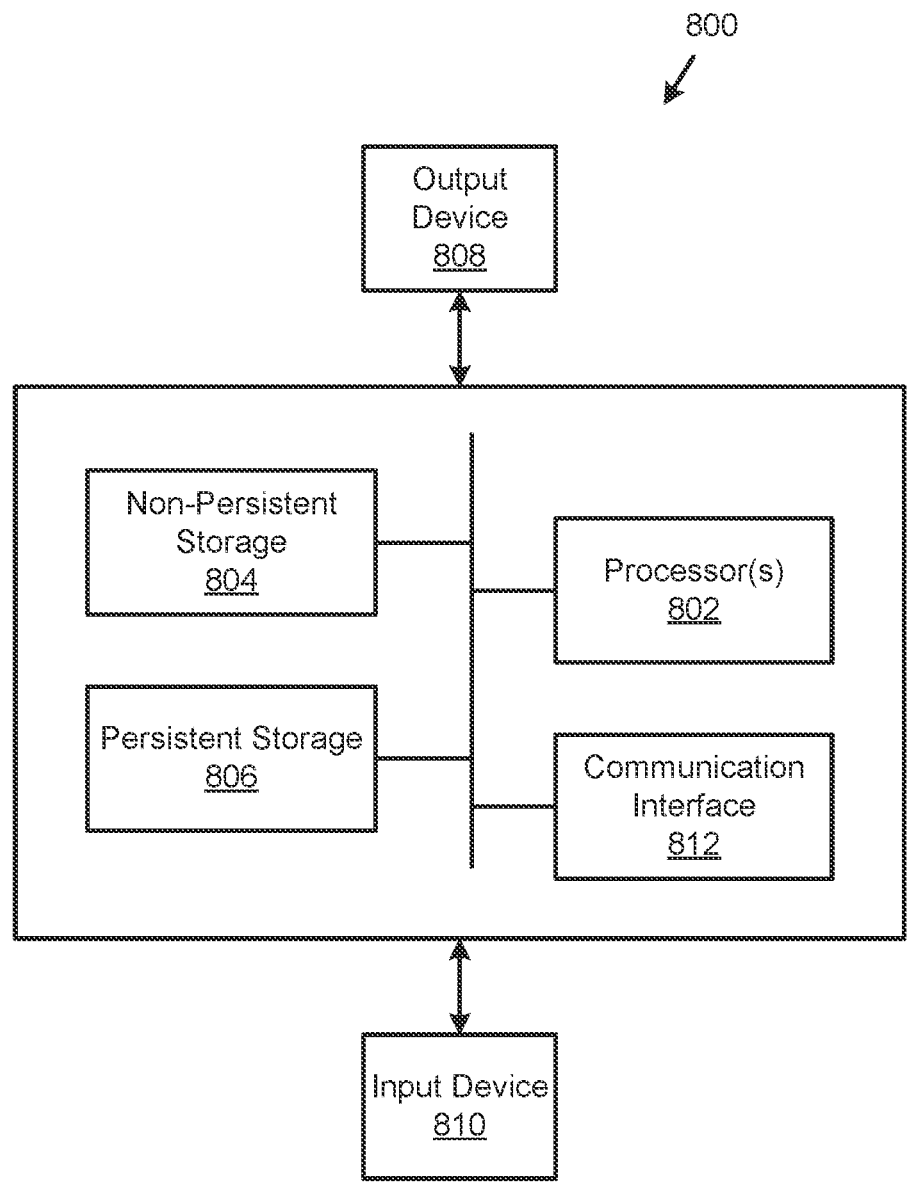
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

One or more embodiments of the invention address the potential security and configuration issues that may arise when reusing resources in different composable systems that are used by different tenants.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A system for providing computer implemented services using information handling systems, comprising:
   persistent storage; and
   a system control processor manager programmed to:
      receive a request to decompose a composed information handling system, wherein the composed information handling system comprises a hardware resource and a second hardware resource;
      obtain a cleaning requirement for the hardware resource;
      initiate, based on the cleaning requirement, a cleaning operation on the hardware resource;
      receive a confirmation that the cleaning operation is complete;
      after receiving the confirmation, set a state of the hardware resource to allocatable;
      obtain a configuration of the second hardware resource;
      determine that the configuration does not match a default configuration of the second hardware resource;
      in response the determination, initiation modification of the configuration of the second hardware resource to match the default configuration;
      after the configuration of the second hardware resource matches the default configuration, set a state of the second hardware resource to allocatable.

2. The system of claim 1, wherein the second hardware resource is a graphics processing unit.

3. The system of claim 1, wherein the hardware resource is a storage device.

4. The system of claim 3, wherein the cleaning operation comprises issuing a command to the hardware resource to delete a stored encryption key on the storage device, wherein all user data stored on the storage device is encrypted using the stored encryption key.

5. The system of claim 1, wherein the cleaning operation renders all user data on the hardware resource unreadable.

6. The system of claim 1, wherein initiating the cleaning operation on the hardware resource comprises:
   initiating a connection between the hardware resource and a cleaning service; and
   instructing the cleaning service to perform the cleaning operation on the hardware resource.

7. The system of claim 1, wherein initiating the cleaning operation on the hardware resource comprises:
   composing a second composed information handling system, wherein a cleaning service is executing on the second composed information handling system;
   initiating a connection between the hardware resource and a cleaning service; and
   instructing the cleaning service to perform the cleaning operation on the hardware resource.

8. The system of claim 1, wherein initiating the cleaning operation on the hardware resource occurs after the hardware resource has transition from an allocated state to a cleaning state, wherein a system control processor in the composed information handling system facilitates the transition of the hardware resource from the allocated state to the cleaning state.

9. A method for providing computer implemented services using information handling systems, comprising:
   receiving a request to decompose a composed information handling system, wherein the composed information handling system comprises a hardware resource and a second hardware resource;
   obtaining a cleaning requirement for the hardware resource;
   initiating, based on the cleaning requirement, a cleaning operation on the hardware resource;
   receiving a confirmation that the cleaning operation is complete;
   after receiving the confirmation, setting a state of the hardware resource to allocatable;
   obtaining a configuration of the second hardware resource;
   determining that the configuration does not match a default configuration of the second hardware resource;
   in response the determination, initiating modification of the configuration of the second hardware resource to match the default configuration; and
   after the configuration of the second hardware resource matches the default configuration, setting a state of the second hardware resource to allocatable.

10. The method of claim 9, wherein the second hardware resource is a graphics processing unit.

11. The method of claim 9, wherein the hardware resource is a storage device.

12. The method of claim 11, wherein the cleaning operation comprises issuing a command to the hardware resource to delete a stored encryption key on the storage device, wherein all user data stored on the storage device is encrypted using the stored encryption key.

13. The method of claim 9, wherein the cleaning operation renders all user data on the hardware resource unreadable.

14. The method of claim 9, wherein initiating the cleaning operation on the hardware resource comprises:
   initiating a connection between the hardware resource and a cleaning service; and
   instructing the cleaning service to perform the cleaning operation on the hardware resource.

15. The method of claim 9, wherein initiating the cleaning operation on the hardware resource comprises:
   composing a second composed information handling system, wherein a cleaning service is executing on the second composed information handling system;
   initiating a connection between the hardware resource and a cleaning service; and
   instructing the cleaning service to perform the cleaning operation on the hardware resource.

16. The method of claim 9, wherein initiating the cleaning operation on the hardware resource occurs after the hardware resource has transition from an allocated state to a cleaning state, wherein a system control processor in the composed information handling system facilitates the transition of the hardware resource from the allocated state to the cleaning state.

17. A non-transitory computer readable medium comprising computer readable program code, which when executed by a computer processor enables the computer processor to perform a method for providing computer implemented services using information handling systems, the method comprising:
   receiving a request to decompose a composed information handling system, wherein the composed information handling system comprises a storage device and a graphics processing unit;
   obtaining a cleaning requirement for the storage device;
   initiating, based on the cleaning requirement, a cleaning operation on the storage device;
   receiving a confirmation that the cleaning operation is complete;
   after receiving the confirmation, setting a state of the storage device to allocatable;
   obtaining a configuration of the graphics processing unit;
   determining that the configuration does not match a default configuration of the graphics processing unit;
   in response the determination, initiating modification of the configuration of the graphics processing unit to match the default configuration; and
   after the configuration of the graphics processing unit matches the default configuration, setting a state of the graphics processing unit to allocatable.

* * * * *